United States Patent
Banerjee et al.

(10) Patent No.: US 10,244,085 B2
(45) Date of Patent: *Mar. 26, 2019

(54) TRANSMISSION CONTROL PROTOCOL (TPC) DATA HANDLING

(71) Applicant: International Business Machines Corporation, Armonk, NY (US)

(72) Inventors: Dwip N. Banerjee, Austin, TX (US); Frederic Barrat, Cugnaux (FR); Khalid Filali-Adib, Austin, TX (US); David Z. Dai, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,678

(22) Filed: Nov. 7, 2017

(65) Prior Publication Data

US 2018/0063294 A1 Mar. 1, 2018

Related U.S. Application Data

(63) Continuation of application No. 14/940,292, filed on Nov. 13, 2015, now Pat. No. 9,854,070.

(51) Int. Cl.
*H04L 29/06* (2006.01)
*G06F 9/445* (2018.01)
(Continued)

(52) U.S. Cl.
CPC ............. *H04L 69/162* (2013.01); *G06F 8/65* (2013.01); *G06F 8/656* (2018.02);
(Continued)

(58) Field of Classification Search
CPC ....... G06F 8/65; H04L 69/162; H04L 67/325; H04L 49/9005; H04L 67/34; H04L 67/1095
See application file for complete search history.

(56) References Cited

U.S. PATENT DOCUMENTS 7,613,118 B2 11/2009 Appanna et al.
8,364,022 B2 1/2013 Sofos et al.
(Continued)

FOREIGN PATENT DOCUMENTS

CN 101465863 6/2009
EP 1460804 9/2004

OTHER PUBLICATIONS

Borman et al.(2014). TCP Extensions for High Performance (RFC7323). IPCOM000238832D, Sep. 1, 2014, pp. 1-49.
(Continued)

*Primary Examiner* — Abdullahi E Salad
(74) *Attorney, Agent, or Firm* — Alexis N. Hatzis (57) ABSTRACT

A method for handling transmission control protocol (TCP) data between networked computer nodes during blackout periods associated with live kernel updating is provided. The method includes initiating a live kernel update on a first node, transmitting, prior to performing a network blocking procedure associated with the live kernel update, a zero window update to one or more peer nodes, generating a surrogate partition associated with the first node, copying network states from an original partition associated with the first node to the surrogate partition, restoring the network states on the surrogate partition, and transmitting another window update to the one or more peer nodes.

20 Claims, 5 Drawing Sheets (51) Int. Cl.
  *H04L 29/08* (2006.01)
  *H04L 12/861* (2013.01)
  *G06F 8/65* (2018.01)
  *G06F 8/656* (2018.01)

(52) U.S. Cl.
  CPC ...... *H04L 49/9005* (2013.01); *H04L 67/1095* (2013.01); *H04L 67/325* (2013.01); *H04L 67/34* (2013.01)

(56) References Cited

U.S. PATENT DOCUMENTS

| | | | | |
|---|---|---|---|---|
| 8,650,579 | B1* | 2/2014 | Herington | G06F 8/65 718/1 |
| 2001/0052084 | A1* | 12/2001 | Huang | H04L 69/40 714/4.3 |
| 2004/0199910 | A1* | 10/2004 | Baack | G06F 8/65 717/171 |
| 2007/0180206 | A1* | 8/2007 | Craft | G06F 11/1433 711/162 |
| 2011/0276699 | A1 | 11/2011 | Pedersen | |
| 2012/0324273 | A1 | 12/2012 | Shaffer et al. | |
| 2013/0163428 | A1 | 6/2013 | Lee et al. | |
| 2013/0318339 | A1 | 11/2013 | Tola et al. | |
| 2014/0108603 | A1 | 4/2014 | Mohr et al. | |
| 2017/0142232 | A1 | 5/2017 | Banerjee et al. | |

OTHER PUBLICATIONS http://ask.wireshark.org/questions/10531/tcp-zerowindow-probe, "TCP ZeroWindow Probe", printed Sep. 18, 2015, 2 pages.

http://wesmorgan.blogspot.com/2011/03/tcp-zero-windows-and-why-the, "Cognitive Buffet", Mar. 21, 2011, 2 pages.

Mell et al., "The NIST Definition of Cloud Computing", National Institute of Standards and Technology, Special Publication 800-145, Sep. 2011, pp. 1-7.

Ebbers et al., "IBM z/OS V1R13 Communications Server TCP/IP Implementation: vol. 3 High Availability, Scalability, and Performance," pp. 56-59 (Feb. 2012).

IBM: List of IBM Patents or Patent Applications Treated as Related (Appendix P), Nov. 7, 2017 pp. 1-2.

* cited by examiner

TRANSMISSION CONTROL PROTOCOL (TPC) DATA HANDLING

BACKGROUND

The present invention generally relates to transmission control protocol (TCP) data handling, and more particularly to TCP data handling during periods of potential network or operating system downtime.

For users running business critical workloads, e.g., on a network system, such as AIX Power System, it may be desirable to eliminate downtime associated with the deployment of patches or updates to the system running the workloads, e.g., when patches or updates require a reboot of an AIX logical partition. It may be desirable that the patches take effect without any downtime to the running workloads or that the workloads take advantage of new types of patches (e.g., directed to kernel, kernel extensions, libraries). For example, a live kernel update may limit such downtime, but such patches may be limited to kernel and kernel extensions. These patches are typically delivered to users as "iFIXES" and may be in response to user-reported issues. However, some patches may still require an AIX partition reboot, e.g., when a change in the AIX kernel or loaded kernel extensions is required. In some instances, patches to critical libraries may also require an AIX partition reboot.

During a live kernel update, network traffic to and from a logical partition (on a system or node receiving the update) may be blocked. Remote peers in the network (e.g., peer nodes) may transmit data that may not be received by the blocked node, and the remote peers may retransmit the unreceived data. If the time allotted for retransmission (e.g., a retransmit span) is shorter than the duration of the network traffic blockage (e.g., network blackout period), a connection reset may occur.

SUMMARY

According to one embodiment, a method for handling transmission control protocol (TCP) data between networked computer nodes during blackout periods associated with live kernel updating is provided. The method includes initiating a live kernel update on a first node, and the live kernel update includes performing a network blocking procedure. Prior to performing the network blocking procedure, the method includes, transmitting a zero window update to one or more peer nodes, generating a surrogate partition associated with the first node, copying network states from an original partition associated with the first node to the surrogate partition, restoring the network states on the surrogate partition, and transmitting another window update to the one or more peer nodes.

According to another embodiment, a computer program product for handling TCP data between networked computer nodes during blackout periods associated with live kernel updating is provided. The computer program product may include at least one computer readable non-transitory storage medium having computer readable program instructions for execution by a processor. The computer readable program instructions may include instructions for initiating a live kernel update on a first node, transmitting, prior to performing a network blocking procedure associated with the live kernel update, a zero window update to one or more peer nodes, generating a surrogate partition associated with the first node, copying network states from an original partition associated with the first node to the surrogate partition, restoring the network states on the surrogate partition, and transmitting another window update to the one or more peer nodes.

According to another embodiment, a computer system for handling TCP data between networked computer nodes during blackout periods associated with live kernel updating is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions may include instructions for initiating a live kernel update on a first node, transmitting, prior to performing a network blocking procedure associated with the live kernel update, a zero window update to one or more peer nodes, generating a surrogate partition associated with the first node, copying network states from an original partition associated with the first node to the surrogate partition, restoring the network states on the surrogate partition, and transmitting another window update to the one or more peer nodes.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1-5, like numerals being used for like and corresponding parts of the various drawings.

According to one embodiment, provided is a method for handling transmission control protocol (TCP) data between networked computer nodes during blackout periods associated with live kernel updating by initiating a live kernel update on a first node, which includes performing a network blocking procedure, transmitting a zero window update to one or more peer nodes prior to performing the network blocking procedure, generating a surrogate partition associated with the first node, copying network states from an original partition associated with the first node to the surrogate partition, restoring the network states on the surrogate partition, and transmitting another window update to the one or more peers. The zero window update may inform peers that the first node will not be able to receive data, e.g., from the peers. The peers may desist from sending data to the first node. Thus, a connection reset may be avoided due to repeated data transmission that may be blocked during a live kernel update.

After the live kernel update (e.g., when the surrogate partition on the first node is no longer blocked from network traffic), a window update (e.g., another window update with a size greater than zero) may be transmitted to the peers and TCP/IP communications between the peers and the surrogate partition on the first node may resume.

In another embodiment, a peer may inflate a socket send buffer size (e.g., above a normal size such as 64 Kb) in response to a notice that a live kernel update has been initiated. This may allow the peer to stage additional data in the socket send buffer (rather than sending additional data that may be blocked, e.g., when a zero window update is received), which may further avoid a disruptive TCP timeout (e.g., connection reset). Temporarily increasing the socket send buffer size may smoothen the effects on TCP data handling due to live kernel updating.

During a live kernel update (e.g., an AIX live update operation) on an original partition in a first node, the first node may create a surrogate partition that may have the same characteristics as the original partition. Data on the original partition may be migrated to the surrogate partition. During data migration to the surrogate partition, network traffic may be blocked to and from the first node (e.g., the original partition and surrogate partition). Network blocking may include loading an internet protocol (IP) filter to block network traffic to and from the IP addresses for the first node.

Figure 1:
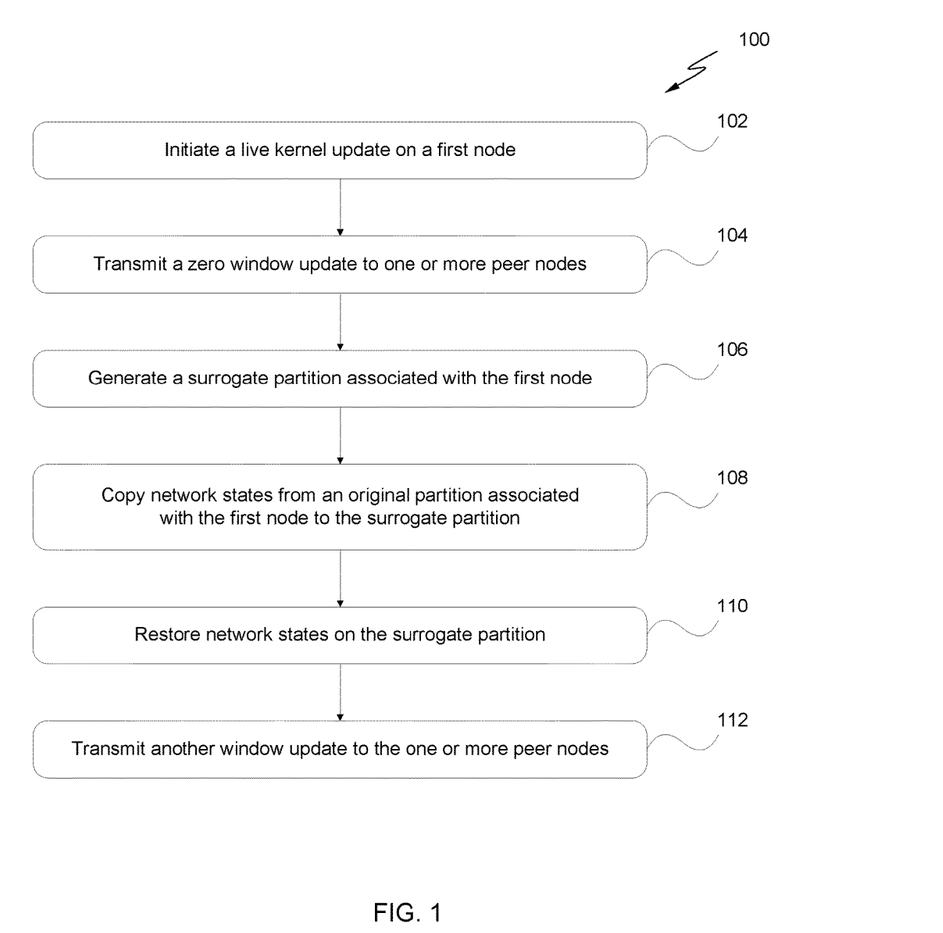
FIG. 1 is a flowchart illustrating an exemplary method of handling transmission control protocol (TCP) data between networked computer nodes during blackout periods associated with live kernel updating, according to an embodiment.

FIG. 1 illustrates a first flowchart 100 depicting an exemplary method for handling TCP data between networked computer nodes during blackout periods associated with live kernel updating, according to an embodiment. The network computer nodes may include a first node and one or more peer nodes. At 102, a live kernel update is initiated on the first node. The live kernel update may be initiated on an original partition (e.g., a first logical partition) on the first node. The live kernel update may include performing a network blocking procedure, e.g., by blocking network traffic to and from IP addresses associated with the first node.

At 104, a zero window update may be transmitted to one or more peer nodes (in the network) and the transmission may occur prior to performing the network blocking procedure associated with the live kernel update. The zero window update may be a communication that informs (receiving) peer nodes that the node sending the zero window update cannot receive any data. In response, peer nodes may refrain from transmitting data to the node sending the zero window update. Typically, zero window updates are sent to convey to other nodes that a receive buffer is full (i.e., the receive buffer has no capacity to receive any incoming data). Here, however, a zero window update may indicate that a node may not receive data for another reason, e.g., network traffic may be blocked to and from the node. A network blocking procedure may be performed after the zero window update is transmitted, which may block network traffic to and from sockets associated with the first node (e.g., associated with an original logical partition on the first node).

The zero window update may be advertised, e.g., to the remote peers on all the existing connections (to the first node). A list of process control blocks (PCBs) on the system (e.g., the first node) may be scanned for any TCP connections. A zero window update may be transmitted (e.g., advertised) through each TCP connection.

At 106, a surrogate partition associated with the first node may be generated. Generation of the surrogate partition may be based on the live kernel update. During the live kernel update, the first node may generate a surrogate partition and migrate data from an original logical partition to the surrogate partition. The surrogate partition may be generated after the network blocking procedure has commenced, e.g., while the network traffic to and from the first node is blocked.

The surrogate partition may have the same characteristics as the original partition. For example, in an automated mode, an AIX live update operation may create a surrogate partition having the same characteristics as the original partition. The root volume group of the surrogate partition (e.g., surr-boot-rootvg) may be a cloned image of the root volume group of the original partition (e.g., orig-rootvg). The cloned image may be created using the AIX utility alt_disk_copy, which may clone the root volume group (of the original partition) and update it with a patch (e.g., an iFIX patch).

Cloning the image of the root volume group may be similar to functionality for updating workloads deployed in a workload partition (WPAR) environment, which may allow updating a kernel or kernel extension running on an AIX logical partition (e.g., a live application mobility feature). While a workload is running, the root volume group of the original partition (e.g., orig-rootvg) may be mirrored onto a mirrored surrogate partition (e.g., surr-mir-rootvg).

After the cloning process, the applications associated with the workloads may be checkpointed (e.g., saving snapshots of an application's state). During the checkpointing process, the root volume group of the original partition (e.g., orig-rootvg) may be split. The mirrored copy of the root volume group (e.g., surr-mir-rootvg) may be imported on the surrogate partition. File systems associated with the root volume group may be mounted in a chrooted environment (e.g., an environment updated by chroot; a modified environment where an operation changed the apparent root directory for a running process and the children of the apparent root directory). The workload may be chrooted on the mirrored volume group, e.g., when the workload is restarted on the mirrored volume group.

When a predetermined amount of data from the original partition is transferred to the surrogate partition, the original partition may be removed (and may be transferred, e.g., to another disk). Remaining resources (e.g., consumed by the original partition) may be transferred to the surrogate partition. A subsequent reboot of the surrogate partition may use the mirrored volume group (e.g., surr-mir-rootvg) as a permanent root volume group for the partition.

The AIX live update operation may be carried out using a standard AIX tool, e.g., geninstall, which may deploy iFIXES and other update packages.

In a scenario where a user may choose to run a workload in an environment prior to an AIX live update operation (e.g., rollback), the running may be achieved by using the disk hosting the original (transferred) partition (e.g., orig-rootvg).

At 108, network states (e.g., TCP/IP states of the sockets associated with the first node) may be copied from the original partition on the first node to the surrogate partition. Copying the network states may be based on the live kernel update. Copying the network states may be part of a data migration from the original logical partition to the surrogate partition, e.g., as part of the live kernel update on the first node. During the data migration, applications running on the original logical partition may be frozen.

At 110, the network states (e.g., associated with the first node) may be restored on the surrogate partition. The restoration of the network states may be based on the live kernel update. The restoration of the network states may include checkpointing the surrogate partition. When the surrogate partition is started (e.g., booted), it may start up while the network traffic (to the node) is blocked.

At 112, another window update may be transmitted to the one or more peer nodes. For example, after the network states are restored on the surrogate partition, and before any frozen applications (e.g., applications frozen during the data migration from the original logical partition to the surrogate partition) are unfrozen on the surrogate partition, a list of PCBs on the surrogate partition may be scanned for TCP connections. Scanning the list of PCBs may be performed while network traffic is blocked to and from the first node (e.g., and sockets associated with the surrogate partition). Another (non-zero) window update may be transmitted (e.g., advertised) through each TCP connection after the network blocking procedure on the first node (e.g., the surrogate partition) has ceased.

The another window update may inform peers that the sending node (e.g., sockets associated with the surrogate partition) may receive data. In other words, the another window update may advertise that the receive buffer on the sending node is greater than zero and may have capacity to receive data. For example, the another window update may be for a normal size such as 64 Kb.

Upon receiving the another window update, the one or more peer nodes may start communicating normally with the first node (e.g., through sockets associated with the surrogate partition).

Figure 2:
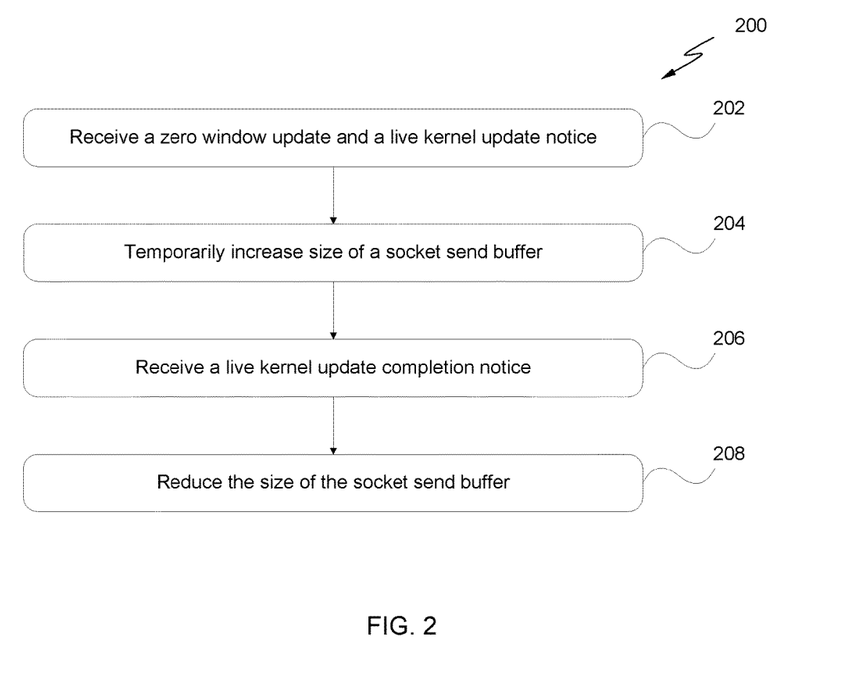
FIG. 2 is a flowchart illustrating an aspect, from a perspective of a peer node, of an exemplary method of handling TCP data between networked computer nodes during blackout periods associated with live kernel updating, according to an embodiment.

FIG. 2 illustrates a second flowchart 200 depicting an aspect, from a perspective of a peer node, of an exemplary method of handling TCP data between networked computer nodes during blackout periods associated with live kernel updating, according to an embodiment. The network computer nodes may include a first node and one or more peer nodes. The method of handling TCP data between networked computer nodes during blackout periods associated with live kernel updating may include the steps, procedures, and features described with respect to FIG. 1. FIG. 2 illustrates additional aspects of an exemplary method from the perspective of a peer node networked to a first node (associated with a live kernel update).

At 202, a zero window update and a live kernel update notice may be received by a peer node. The zero window update may be a communication that informs (receiving) peer nodes that the node sending the zero window update cannot receive any data. In response, peer nodes may refrain from transmitting data to the node sending the zero window update.

The live kernel update notice may be a communication that informs (receiving) peer nodes that the node sending the live kernel update notice may experience a live kernel update operation. It will be appreciated that the reaction of the peer node receiving the zero window update or the live kernel update notice may be dependent on the TCP specifications associated with the peer node. For example, the peer node's reaction to the zero window update may be to stop sending data, according to the peer node's TCP specification. In addition, the peer node (receiving the zero window update) may receive a live kernel update notice and may factor the live kernel update notice into the peer node's response to the zero window update.

At 204, in response to receiving the zero window update and the live kernel update notice, the peer node may temporarily increase a capacity of a socket send buffer (e.g., inflate the socket send buffer associated with the peer node). For example, the peer node may temporarily inflate the socket send buffer to a size above a standard size, e.g., 64 Kb.

Network traffic to and from the first node (e.g., the node undergoing the live kernel update) may be blocked based on the live kernel updating. Inflating the socket send buffer on the peer node may enable (additional) data to be staged in the socket send buffer of the peer, and may provide an alternative to transmitting the data to a node that may not be able to receive the data. Inflating the socket send buffer, as described herein, may avoid disruptive TCP timeouts caused by failed attempts to transmit data to a node that may not be able to receive data, e.g., the first node undergoing a live kernel update.

At 206, a live kernel update completion notice may be received by the peer node. The live kernel update completion notice may inform the peer node that the live kernel update (e.g., the live kernel update operation performed on the first node) has been completed and network traffic to and from the first node is unblocked. It will be appreciated that the reaction of the peer node receiving the another window update or the live kernel update completion notice may be dependent on the TCP specifications associated with the peer node. For example, the peer node's reaction to the another window update may be to restart sending data, according to the peer node's TCP specification. In addition, the peer node (receiving the another window update) may receive a live kernel update completion notice and may factor the live kernel update completion notice into the peer node's response to the another window update.

In one embodiment, the live kernel update completion notice may be transmitted to peer nodes along with another (non-zero) window update, as described above. For example, a list of process control blocks (PCBs) on the system (e.g., the first node) may be scanned for any TCP connections. The live kernel update completion notice may be transmitted (e.g., advertised) through each TCP connection, e.g., after the live kernel update has been completed and the network traffic is unblocked on the first node.

At 208, in response to receiving the live kernel update completion notice, the peer node may reduce the capacity of the socket send buffer (e.g., deflate the socket send buffer associated with the peer node). For example, the peer node may deflate the socket send buffer to a standard or normal size, e.g., 64 Kb. In one embodiment, the peer node may temporarily inflate a socket send buffer to a size larger than previously set (e.g., in response to receiving a zero window update and a live kernel update notice) and may deflate the socket send buffer to the same previous size or some other size (e.g., in response to receiving a live kernel update completion notice).

It will be appreciated that the receiving logic (for the peers) may not be affected during the inflation (and deflation) of the socket send buffer associated with the peer nodes, as described herein.

The ability to temporarily inflate the socket send buffer may be communicated to the peer nodes during TCP connection establishment. For example, a temporary buffer inflation permission may be transmitted to a peer node during connection establishment, and the peer node may temporarily inflate the capacity of the socket send buffer based on the temporary buffer inflation permission (and in response to the zero window update and the live kernel update notice).

In an alternative embodiment, temporarily inflating the socket send buffer (to accommodate a staging area for additional data) may be used in association with general handling of zero window updates, e.g., irrespective of live kernel updating. For example, it is contemplated that handling TCP data associated with zero window updates can be improved by employing a method of temporarily inflating the socket send buffer of a peer receiving a zero window update.

In one embodiment, during a live kernel update, network checkpointing, e.g., on logical partitions on a first node, may be performed. A checkpoint and restart of a logical partition's network connectivity may include the following:

Network traffic to and from an original logical partition may be blocked. Network traffic may be blocked by loading an IP filter to block network traffic to and from IP addresses associated with the node being checkpointed. The state of the TCP connection timers may be preserved, which may include removing all the connections from the path of the timer processing functions and initiated from a global logical partition.

For a given file descriptor, file descriptor information may be retrieved and checkpointed. Checkpointing may be initiated from the original partition process context (or the kernel for orphaned connections) and may include the following:
  Saving the socket state and protocol control block state along with queued buffers;
  For sockets in a LISTEN state, the queued connections may be saved (as they may not have been accepted); and
  For UNIX domain sockets, the file descriptors embedded in in-flight messages may be saved.

The network connections may be restored from the checkpoint file on restart, which may be initiated from the surrogate partition process context (or global partition for orphaned connections) and may include the following:
  Restoring the socket state and protocol control block state and queued buffers;
  For sockets in a LISTEN state, the queued connections may be restored (as they may not have been accepted);
  For UNIX domain sockets, the file descriptors embedded in in-flight messages may be restored; and
  Internet group management protocol (IGMP) packets and sockets bound to multicast addresses may be requested.

In one embodiment, the method may further include transmitting a live kernel update notice to each peer node from the one or more peer nodes, and in response to receiving the zero window update and the live kernel update notice, each peer node from the one or more peer nodes temporarily increases a capacity of a socket send buffer.

In a further embodiment, the method may include transmitting a live kernel update completion notice to the first peer node, and in response to receiving the live kernel update completion notice, the first peer node reduces the capacity of the socket send buffer.

In a further embodiment, the method may include transmitting a temporary buffer inflation permission to the first peer node during connection establishment, and the first peer node temporarily increases the capacity of the socket send buffer based on the temporary buffer inflation permission (and based on receiving the zero window update and the live kernel update notice).

In one embodiment, transmitting the another window update includes scanning, during performing the network blocking procedure, a list of process control blocks for a TCP connection, and transmitting, after performing the network blocking procedure, the another window update through the TCP connection.

In another embodiment, transmitting the another window update includes scanning, during performing the network blocking procedure, a list of process control blocks for all TCP connections, and transmitting, after performing the network blocking procedure, the another window update through all TCP connections.

In another embodiment, a method for updating a base operating system without restarting applications and minimizing packet loss by setting TCP/IP receive buffer sizes to zero during live kernel migration (e.g., updating) is provided. The method may include migrating a running virtual environment from a first system (e.g., a sending system) with a first (e.g., a base) operating system level to a second system (e.g., a receiving system) with a second operating system level greater than the first operating system level. The method may also include setting each receive buffer size to zero (e.g., using a zero window update) for each TCP/IP socket on the second system (associated with the running virtual environment), prior to copying the TCP/IP states from the first system to the second system.

In a further embodiment, the method may include increasing TCP/IP buffer sizes used by the virtual environment on the first system prior to copying TCP/IP states from the first system to the second system.

In another further embodiment, the virtual environment may be a virtual machine, a logical partition, and a workload partition.

Embodiments disclosed and contemplated herein may be implemented and performed on a computing node, e.g., disclosed herein.

Figure 3:
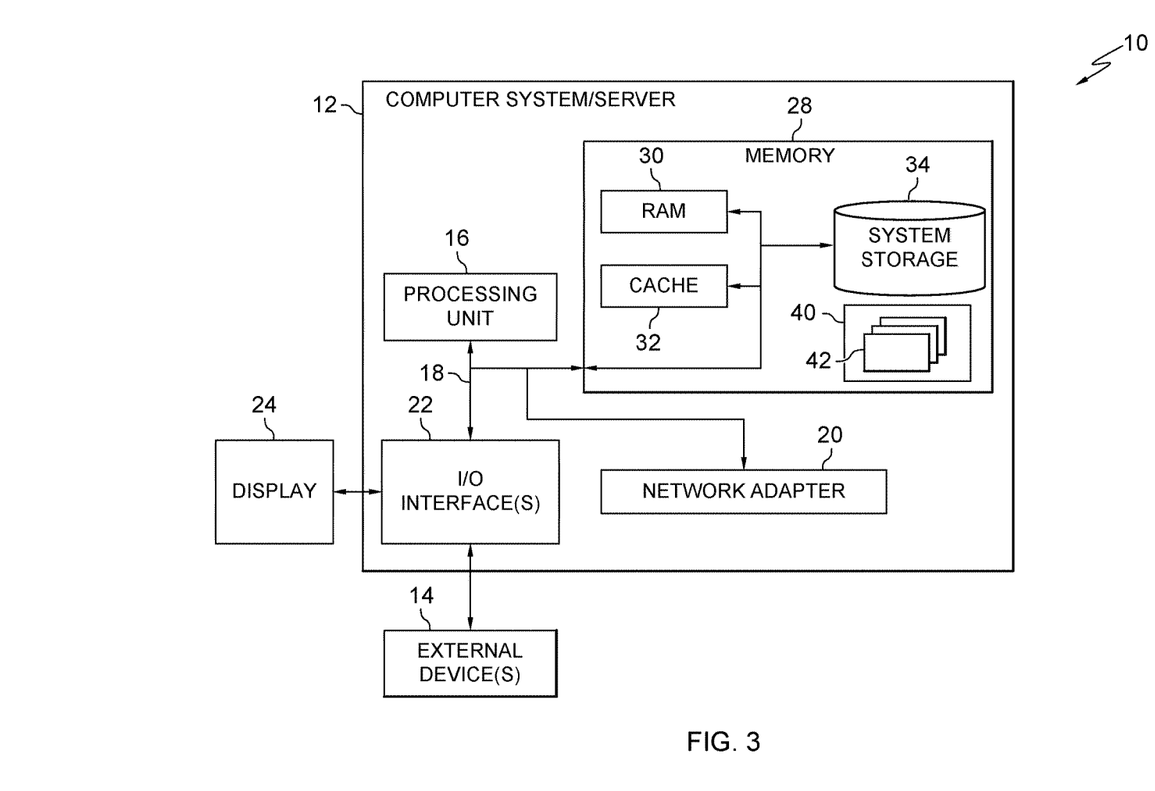
FIG. 3 is a block diagram illustrating a computing node, according to an aspect of the invention.

FIG. 3 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
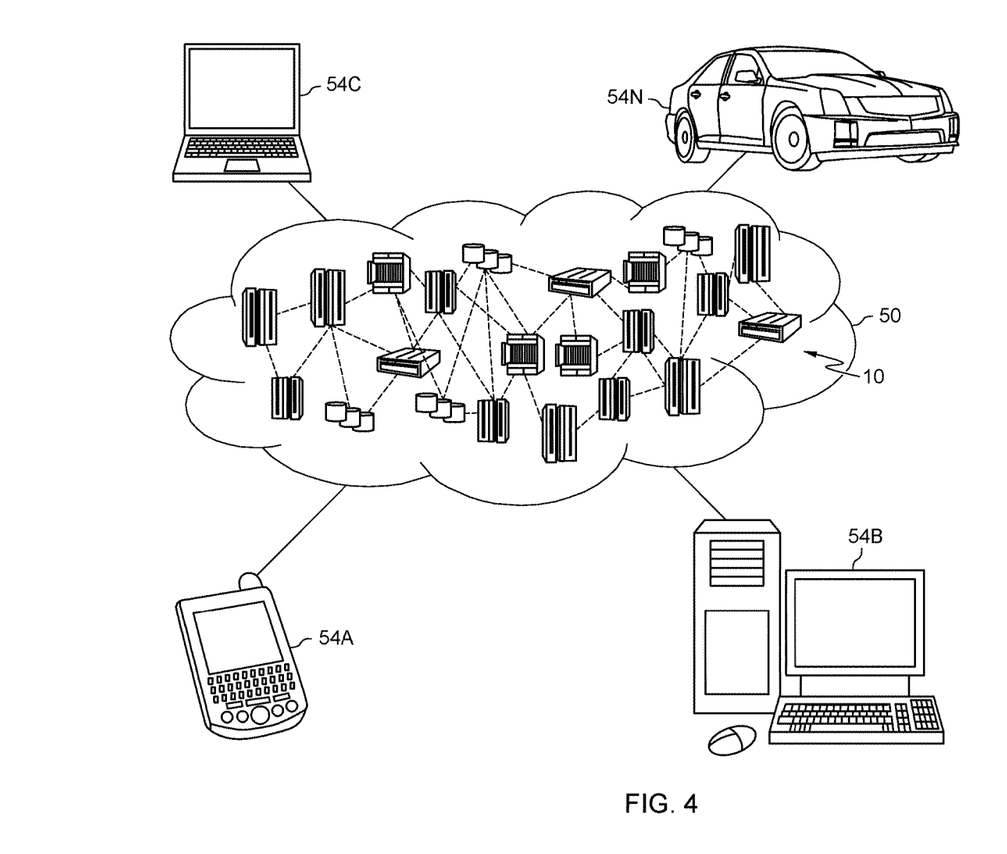
FIG. 4 depicts a cloud computing environment according to an embodiment of the present invention.

Referring now to FIG. 4, illustrative cloud computing environment 50 is depicted. As shown, cloud computing environment 50 comprises one or more (cloud) computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
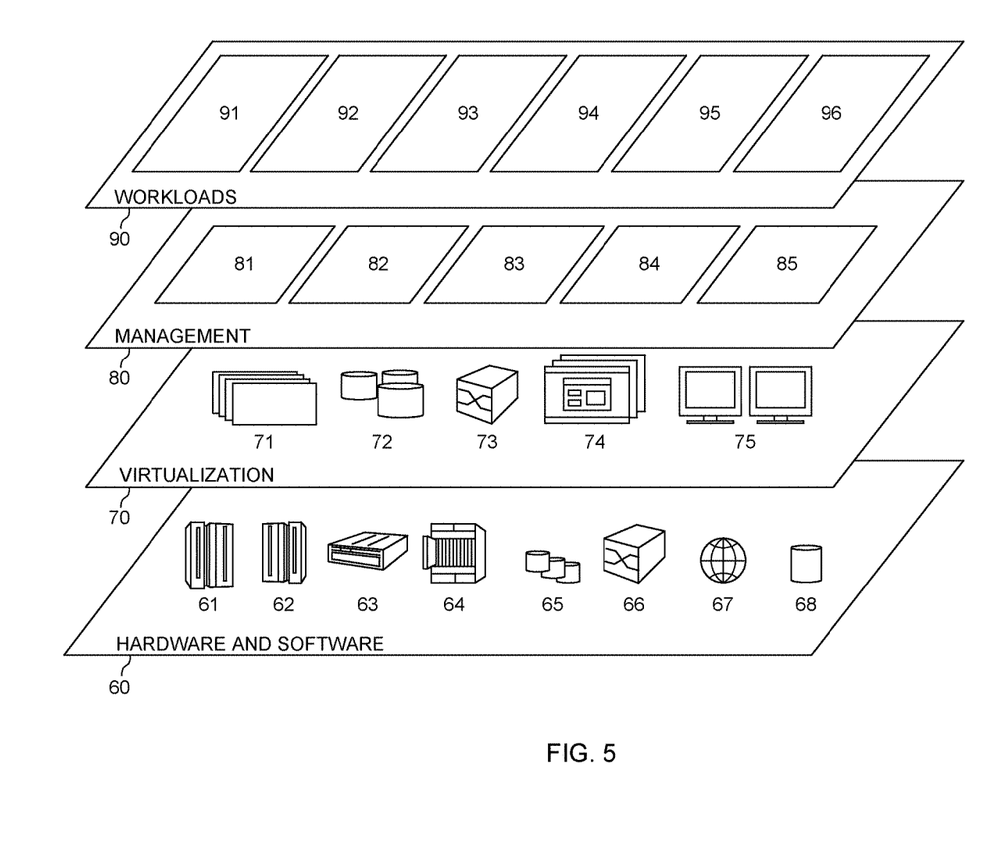
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Methods for handling TCP data between networked computer nodes during blackout periods associated with live kernel updating may be performed in a cloud environment, e.g., in the hardware and software layer 60 and/or the virtualization layer 70.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for handling transmission control protocol (TCP) data between networked computer nodes during blackout periods associated with live kernel updating, the method comprising:
   initiating a live kernel update on a first node;
   transmitting a zero window update to one or more peer nodes;
   generating a surrogate partition associated with the first node;
   copying network states from an original partition associated with the first node to the surrogate partition;
   restoring the network states on the surrogate partition; and
   transmitting another window update to the one or more peer nodes.

2. The method according to claim 1, further comprising:
   transmitting a live kernel update notice to each peer node from the one or more peer nodes; and
   wherein, in response to receiving the zero window update and the live kernel update notice, each peer node from the one or more peer nodes temporarily increases a capacity of a socket send buffer.

3. The method according to claim 2, further comprising:
   transmitting a live kernel update completion notice to a first peer node; and
   wherein, in response to receiving the live kernel update completion notice, the first peer node reduces the capacity of the socket send buffer.

4. The method according to claim 2, further comprising:
   transmitting a temporary buffer inflation permission to a first peer node during connection establishment; and
   wherein the first peer node temporarily increases the capacity of the socket send buffer based on receiving the zero window update and the live kernel update notice, and the temporary buffer inflation permission.

5. The method according to claim 1, wherein transmitting the zero window update comprises:
   scanning a list of process control blocks for a TCP connection; and
   transmitting the zero window update through the TCP connection.

6. The method according to claim 1, wherein transmitting the another window update comprises:
   scanning, during performing a network blocking procedure, a list of process control blocks for a TCP connection; and
   transmitting, after performing the network blocking procedure, the another window update through the TCP connection.

7. The method according to claim 5, wherein transmitting the another window update comprises:
   scanning, during performing a network blocking procedure, the list of process control blocks for all TCP connections; and
   transmitting, after performing the network blocking procedure, the another window update through all TCP connections.

8. A computer program product for handling transmission control protocol (TCP) data between networked computer nodes during blackout periods associated with live kernel updating, the computer program product comprising at least one computer readable non-transitory storage medium having computer readable program instructions thereon for execution by a processor, the computer readable program instructions comprising program instructions for:
   initiating a live kernel update on a first node;
   transmitting a zero window update to one or more peer nodes;
   generating a surrogate partition associated with the first node;
   copying network states from an original partition associated with the first node to the surrogate partition;
   restoring the network states on the surrogate partition; and
   transmitting another window update to the one or more peer nodes.

9. The computer program product according to claim 8, wherein the computer readable program instructions further comprise program instructions for:
   transmitting a live kernel update notice to each peer node from the one or more peer nodes; and
   wherein, in response to receiving the zero window update and the live kernel update notice, each peer node from the one or more peer nodes temporarily increases a capacity of a socket send buffer.

10. The computer program product according to claim 9, wherein the computer readable program instructions further comprise program instructions for:
    transmitting a live kernel update completion notice to a first peer node; and
    wherein, in response to receiving the live kernel update completion notice, the first peer node reduces the capacity of the socket send buffer.

11. The computer program product according to claim 9, wherein the computer readable program instructions further comprise program instructions for:
    transmitting a temporary buffer inflation permission to a first peer node during connection establishment; and
    wherein the first peer node temporarily increases the capacity of the socket send buffer based on receiving the zero window update and the live kernel update notice, and the temporary buffer inflation permission.

12. The computer program product according to claim 8, wherein transmitting the zero window update comprises:
    scanning a list of process control blocks for a TCP connection; and
    transmitting the zero window update through the TCP connection.

13. The computer program product according to claim 8, wherein transmitting the another window update comprises:
    scanning, during performing a network blocking procedure, a list of process control blocks for a TCP connection; and
    transmitting, after performing the network blocking procedure, the another window update through the TCP connection.

14. The computer program product according to claim 12, wherein transmitting the another window update comprises:
    scanning, during performing a network blocking procedure, the list of process control blocks for all TCP connections; and
    transmitting, after performing the network blocking procedure, the another window update through all TCP connections.

15. A computer system for handling transmission control protocol (TCP) data between networked computer nodes during blackout periods associated with live kernel updating, the computer system comprising:
- at least one processing unit;
- at least one computer readable memory;
- at least one computer readable tangible, non-transitory storage medium;
- and program instructions stored on the at least one computer readable tangible, non-transitory storage medium for execution by the at least one processing unit via the at least one computer readable memory, wherein the program instructions comprise program instructions for:
- initiating a live kernel update on a first node;
- transmitting a zero window update to one or more peer nodes
- generating a surrogate partition associated with the first node;
- copying network states from an original partition associated with the first node to the surrogate partition;
- restoring the network states on the surrogate partition; and
- transmitting another window update to the one or more peer nodes.

16. The computer system according to claim 15, wherein the program instructions further comprise program instructions for:
- transmitting a live kernel update notice to each peer node from the one or more peer nodes; and
- wherein, in response to receiving the zero window update and the live kernel update notice, each peer node from the one or more peer nodes temporarily increases a capacity of a socket send buffer.

17. The computer system according to claim 16, wherein the program instructions further comprise program instructions for:
- transmitting a live kernel update completion notice to a first peer node; and
- wherein, in response to receiving the live kernel update completion notice, the first peer node reduces the capacity of the socket send buffer.

18. The computer system according to claim 16, wherein the program instructions further comprise program instructions for:
- transmitting a temporary buffer inflation permission to a first peer node during connection establishment; and
- wherein the first peer node temporarily increases the capacity of the socket send buffer based on receiving the zero window update and the live kernel update notice, and the temporary buffer inflation permission.

19. The computer system according to claim 15, wherein transmitting the zero window update comprises:
- scanning a list of process control blocks for a TCP connection; and
- transmitting the zero window update through the TCP connection.

20. The computer system according to claim 15, wherein transmitting the another window update comprises:
- scanning, during performing a network blocking procedure, a list of process control blocks for a TCP connection; and
- transmitting, after performing the network blocking procedure, the another window update through the TCP connection.

* * * * *